(12) United States Patent
Arnold et al.

(10) Patent No.: US 11,633,024 B1
(45) Date of Patent: Apr. 25, 2023

(54) PORTABLE SUSPENDED INVERTED UMBRELLA WITH QUICK RELEASE FABRIC

(71) Applicants: Robert Scott Arnold, Key Largo, FL (US); Andrew Scott Arnold, Jamul, CA (US); Michael Joseph Arnold, Winthrop, MA (US)

(72) Inventors: Robert Scott Arnold, Key Largo, FL (US); Andrew Scott Arnold, Jamul, CA (US); Michael Joseph Arnold, Winthrop, MA (US)

(73) Assignee: Robert Schott Arnold, San Diego, CA (US)

( * ) Notice: Subject to any disclaimer, the term of this patent is extended or adjusted under 35 U.S.C. 154(b) by 105 days.

(21) Appl. No.: 17/185,280

(22) Filed: Feb. 25, 2021

(51) Int. Cl.
| | | |
|---|---|---|
| A45B 23/00 | (2006.01) | |
| A45B 19/00 | (2006.01) | |
| A45B 11/00 | (2006.01) | |
| B63B 17/02 | (2006.01) | |
| B60R 11/00 | (2006.01) | |
| A01K 97/10 | (2006.01) | |

(52) U.S. Cl.
CPC .............. *A45B 23/00* (2013.01); *A45B 11/00* (2013.01); *A45B 19/00* (2013.01); *B60R 11/00* (2013.01); *B63B 17/02* (2013.01); *A01K 97/10* (2013.01); *A45B 2019/008* (2013.01); *A45B 2023/0037* (2013.01); *B60R 2011/0059* (2013.01)

(58) Field of Classification Search
CPC ...... A45B 2019/008; A45B 2023/0037; A45B 11/00; A45B 23/00; A45B 2023/0081
See application file for complete search history.

(56) References Cited

U.S. PATENT DOCUMENTS

| | | | | |
|---|---|---|---|---|
| 2,767,723 | A * | 10/1956 | Sears, Jr. ................ | A45B 23/00 135/21 |
| 3,765,434 | A * | 10/1973 | Riggs ................... | F16M 13/022 135/20.1 |
| 4,061,154 | A * | 12/1977 | Cox ........................ | A45B 25/18 135/33.5 |
| 4,284,095 | A * | 8/1981 | Norton ................... | A45B 11/00 135/21 |
| 4,449,542 | A * | 5/1984 | McSwain ............ | A01M 31/025 135/21 |
| 5,499,644 | A * | 3/1996 | Geniele ................ | E04H 12/2238 135/21 |
| 5,937,881 | A * | 8/1999 | Villa ....................... | A45B 23/00 135/21 |
| 6,860,280 | B2 * | 3/2005 | Wolcott ................... | B63B 17/00 135/21 |

(Continued)

*Primary Examiner* — Noah Chandler Hawk (57) ABSTRACT

A portable lightweight sun blocking shade system designed to provide freedom of movement under the shaded area, with a fast deployment and a safe fabric release under high wind conditions. To make shade over a desired area, position the holder apparatus to block sun, suspend the closed umbrella shade apparatus at the overhead hanger, open the suspended umbrella with a simple vertical lift of the lower handle to lock at the center shaft. To store shade, simply unlock the open umbrella with a push of the handle button, allow gravity to lower the handle, and remove the closed shade from the hanger. The holder apparatus can be left in place, or quickly removed for complete shade system storage.

12 Claims, 8 Drawing Sheets

(56) References Cited

U.S. PATENT DOCUMENTS

| | | | |
|---|---|---|---|
| 7,156,114 B2 * | 1/2007 | Lo | A45B 23/00 |
| | | | 135/21 |
| 9,232,836 B1 * | 1/2016 | Zaccaro | A45B 23/00 |
| 10,212,996 B2 * | 2/2019 | Stewart-Stand | A45B 23/00 |
| 10,309,580 B1 * | 6/2019 | Baker | A45B 11/00 |

* cited by examiner

PORTABLE SUSPENDED INVERTED UMBRELLA WITH QUICK RELEASE FABRIC

BACKGROUND

This relates to shade umbrellas and parasols, specifically to shade umbrellas with suspended quickly-attached quickly-released connection and inverted umbrella framework construction. This invention is designed for safety and durability with fabric release at increased wind or foul weather conditions. This invention is for covering areas where freedom of movement, ease of setup and removal, portability and user safety are important.

Shade solutions, offered for boating, recreational vehicles, outdoor patios and other active areas, can be permanently attached, heavy, mechanically complicated and difficult to position. This invention takes advantage of adjustable design, light weight and strength of materials to provide a quick installation of effective shade cover when needed, and quick removal of shade when not needed.

In this embodiment, when employed as a shade solution for fishing boats, the system is for use in the area of a fishing boat where freedom of movement under the shade and around the full perimeter of the vessel is highly useful. Other patents recognise the benefit of these features. U.S Pat. No. 2018/0057113 A1 to Killian (Mar. 1, 2018) specifically uses T-top rod holders for a cantilever square frame shade provided at boat rear cockpit; however this depicts a solution that is more cumbersome to deploy and recover, and potentially unsafe to occupants if left deployed in harsh wind weather conditions. U.S. Pat. No. 6,860,280 B2 to Wolcott (Mar. 1, 2005) is for a recreational umbrella indicated for inflatable raft boats, mounted to the side of the boat with a cantilever suspended umbrella, this configuration restricts fishing access and requires significant clearance space below to open and close the bottom opening umbrella. U.S. Pat. No. 9,194,152 B1 to Plasencia (Nov. 24, 2015) for a cantilever square frame shade mounted to boat hull sides makes it difficult for fishing line transition around the boat, and is also cumbersome to deploy and recover for movement, wind and weather.

A shade solution for fishing will allow an active fishing rod with line in the water to circle the full perimeter of the boat. This invention solves that problem by mounting shade from high mounted rod holders, at T-top or cabin top. Invention includes a portable, adjustable cantilever support system that allows the shade to be positioned within the cantilever arc, from port to starboard and from bow to stern. The cantilever arc is selected by choosing fishing rod holders locations from the common array of options, from placement centered or to port or to starboard, forward and aft. Embodiment provides a cantilever solution that is designed for easy, quick installation and removal, both at the rod holder installation and at the umbrella hub attachment. This is a key feature of this design. The cantilever support tube is first installed into a rod holder, with tube angled for best umbrella shade height. The umbrella is then attached at the hub hanger, by inserting the umbrella center tube end with fixed pins within the receiving slots of the hanger tube. With a slight axial turn of the umbrella into the hanging slot, the umbrella can be released and gravity rested within the hanger. U.S. Pat. No. 5,499,644 to Geniele (Mar. 19, 1996) uses a suspended removable umbrella system with multiple pins and a hanging tube inside two flat holding surfaces, included with the more common bottom opening umbrella. A portable suspended cantilever umbrella U.S. Pat. No. 5,611,364 to Woods et al (Mar. 18, 1997) uses a wing nut at the bottom opening umbrella hub to allow for removal and storage, which is slower and requires two hands.

To safely accommodate people within proximity, this suspended umbrella is fully opened by lifting the lower umbrella hub handle from below, as the inverted rib tips move outward horizontally at the top hub, appearing similar to a flower opening to the sun. This deployment system allows boat occupants to stay in place as the inverted umbrella is opened above their heads; a very useful function for a busy fishing cockpit. International Pat. No. PCT/GB 2005/000988 to Vardy (Mar. 15, 2005) uses an inverted storage and deployment system similar to this, however using a center pole umbrella mounting system that restricts movement below the umbrella. U.S. Pat. No. 2007/0209688 to Earnshaw (Sep. 13, 2007) depicts an inverted mounting option for umbrella storage, which offers movement below while the umbrella is stored in place.

If the boat is in motion, or if the wind picks up, this umbrella shade should be removed and stored. Shade apparatus is released by the hub handle button, dropped in place, folded up, unmounted from the suspended hanger and safely stored. This requirement, for storing the shade system while boating underway, is a common requirement of several marine shade systems. Sureshade of Philadelphia, Pa. makes a popular overhead shade extension for boat tops, very similar to U.S. Pat. No. 7,395,774 B2 to Borges et al (Jul. 8, 2008), and U.S. Pat. No. 7,895,964 B2 to Russikoff (Mar. 1, 2011), and U.S. Pat. No. 8,857,366 B2 to Russikoff (Oct. 14, 2014) and U.S. Pat. No. 9,139,258 B2 to Russikoff (Sep. 22, 2015) where a tubular telescoping framework opens to a square shade area, instructions require shade retraction and storage when the boat is underway.

This embodiment is designed for use with existing overhead rod holder configurations, however optional aftermarket rod holder systems or solution design mount systems can be added to boats, optimally rugged and suitable for use with this invention. A cantilever arm is inserted into the desired rod holder and then adjusted to the desired support position height, while being held in this position by a radial rotation friction clamp or radial toothed mating clamp and the mating pressure applied by cam-locking adjustable nuts. The cantilever apparatus may include telescoping tubes for optimal shade placement. An umbrella mount designed to facilitate an offset shade placement is provided in U.S. Pat. No. 9,127,475 B2 to LeAnna (Sep. 8, 2015), although not indicated for boat use, it offers a potential solution. The goal of shade placement is also a feature of U.S. Pat. No. 10,118,671 B2 to Gharabegian (Nov. 6, 2018) with an automated, complex "marine intelligent shading system" as sold by the company Shadecraft of Pasadena, Calif.

Inside the hub of the installed umbrella system, is a vertical pin and slot system that when locked in the deployed position, prevents the umbrella hub from inadvertently moving vertically and then rotationally to release position. This is a safety feature that locks the suspended center shaft to the bayonet hanger socket and can only be removed when the umbrella is released and dropped into the folded position.

The suspended hub design is also applicable to many other embodiments of mounting options for vessels, vehicles and living spaces. For hard-top boats, an overhead telescoping frame can slide out and adjust to desired position, or added with a removable cantilever installed on to a dedicated mount. For open top patio boats or dingy, a removable pole framework can be inserted into mounting features. For sailing vessels, the shade umbrella can be suspended from the overhead sail boom with a removable, adjustable bracket. For recreational vehicles, a quick release mounting system can be attached outside the RV enclosure to fix cantilever rod and umbrella holder. Living spaces can be enhanced with eave or column or pole mounted adjustable cantilever frameworks, or simple hubs attached to overhead landscape features or trellis.

Inasmuch as the goal of this embodiment is to cantilever a suspended umbrella shade system, there is prior art to recognise. Cantilever umbrella systems are otherwise broadly available. A suspended fixed cantilever umbrella system is represented in U.S. Pat. No. 7,156,114 B2 to Lo (Jan. 2, 2007); U.S. Pat. No. 9,237,785 B2 to Ma (Jan. 19, 2016); U.S. Pat. No. 9,565,907 B2 to Ma (Feb. 14, 2017); U.S. Pat. No. 6,401,739 B1 to Bright et al (Jun. 11, 2002); U.S. Pat. No. 9,642,421 B2 to Ma (May 9, 2017); U.S. Pat. No. 10,104,945 B2 to Bauer (Oct. 23, 2018). A truss triangulated fixed cantilever is represented in a broad number of patio umbrella systems such as U.S. Pat. No. 8,104,492 to Dan (Jan. 31, 2012); U.S. Pat. No. 9,968,168 B2 to Ma (May 15, 2018); U.S. Pat. No. 9,220,325 B2 to Ma (Dec. 29, 2015); U.S. Pat. No. 9,861,168 to Ma (Jan. 9, 2018); U.S. Pat. No. 2018/0125183 A1 to Brebner (May 10, 2018); U.S. Pat. No. 9,957,728 B2 to Ma (May 1, 2018); U.S. Pat. No. 6,196,242 B1 to Xu (Mar. 6, 2001).

SUMMARY

Boat occupants as well as many other participants of outdoor actives are frequently exposed to the sun and weather. It is desirable to seek shade protection from the sun during long outings so even makeshift fabric solutions are common. This invention is to provide a simple portable shade system that safely meets the needs of active boat users and other outdoor activity.

The primary features of this shade invention are unique in combination and are required for desired operation, comprising 1) movable holder assembly with umbrella hanger thereby suspending and positioning the shade umbrella in place securely, 2) the inverted umbrella shade opening system, which requires a small clearance area at personal space level and unfurling horizontally overhead when lifted vertically at the lower hub, and 3) the fabric release system which insures that the fabric does not overreact to wind and rain, and releases the force of wind.

DETAILED DESCRIPTION

Figure 1:
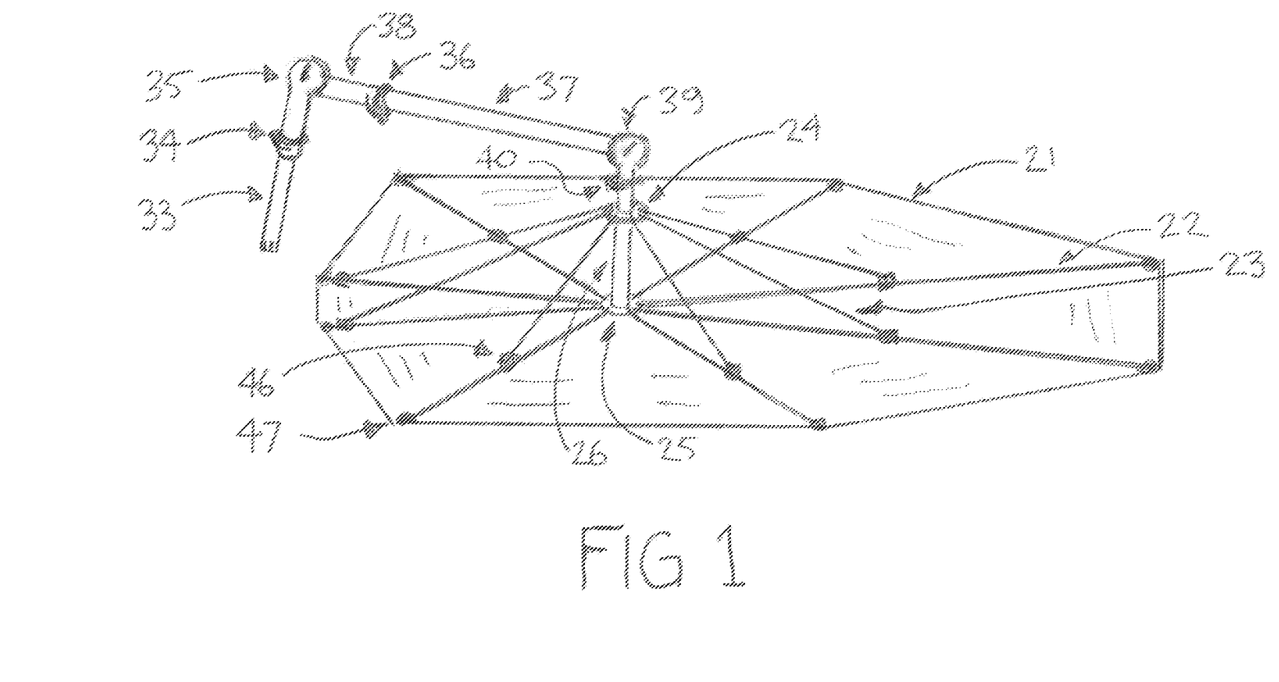
FIG. 1 is a perspective view of the deployed configuration of a single short cantilever holder apparatus and an asymmetric shade apparatus showing the upper side with fabric attached to umbrella framework

FIG. 1 is a perspective view of deployed holder apparatus and shade apparatus as it would appear installed for fishing boats with overhead rod holder mount, short cantilever, and asymmetric umbrella shade. To deploy the shade in this embodiment, the user adjusts the holder apparatus by first estimating the desired cantilever angle from rod holder to umbrella height and setting clamp 35. Shade user would then adjust the arch position of the cantilever holder arm and clamp 34 at the desired position. If needed, shade user would then adjust telescope length and rotation of cantilever tubes 37 to 38 using clamp 36 to position at desired length and angle. The umbrella shaft hanger socket 27 is adjusted to desired position and set with clamp 39. The shade apparatus is next lifted and inserted into the bayonet hanger by center shaft 26 and hung into place with a firm clockwise turn. To deploy the shade, the user then lifts the lower umbrella hub 25 by the bottom handle, whereby the umbrella ribs raise horizontally into position and locked into place by inserting the short center shaft 26 into the lower hub handle 30 until push pin 31 locks into position. To remove the shade apparatus, the user reverses these procedures.

Figure 2A:
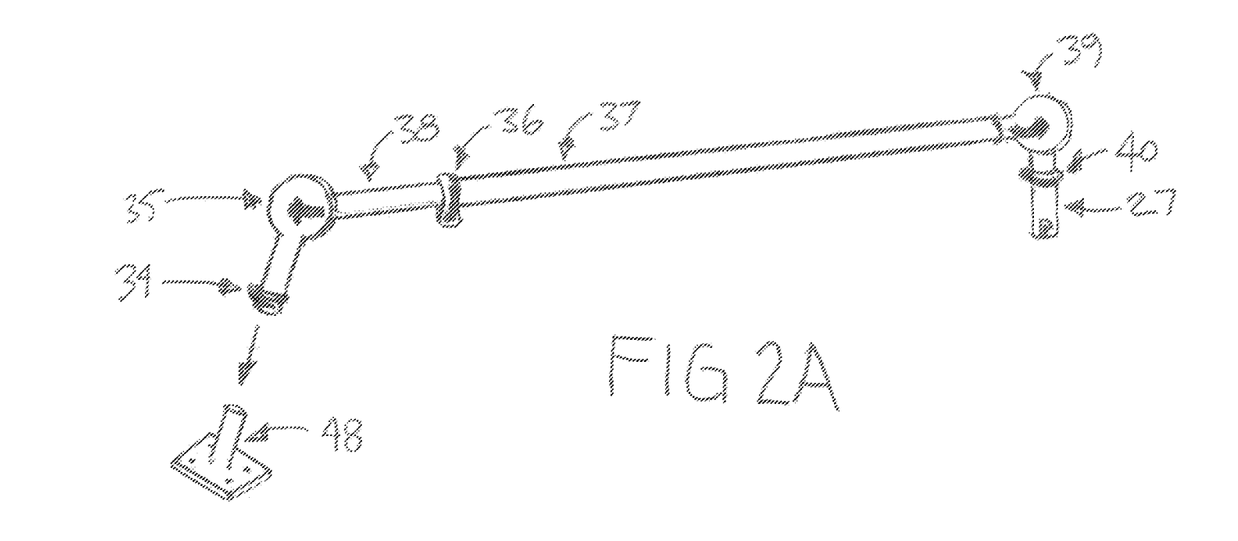
FIG. 2A is a perspective view of a flat mounting base to long cantilever umbrella holder apparatus with cam clamps

FIG. 2A is a perspective view of the cantilever umbrella holder apparatus as it would appear lined up to insert a flat surface mounting shaft 48. Primarily made from aluminum, the cantilever holder apparatus adjusts position in many axes, to accommodate the fact that boat and RV mount options are not set to any standard position. In this embodiment, the cantilever arch is set by clamp 34, height angle is set by adjusting the rotation clamp 35 and the hanger socket 27 is positioned by sliding the tubular support in or out and rotationally with clamp 36 and tilt position clamp 39 to put the shade apparatus in position.

Figure 2B:
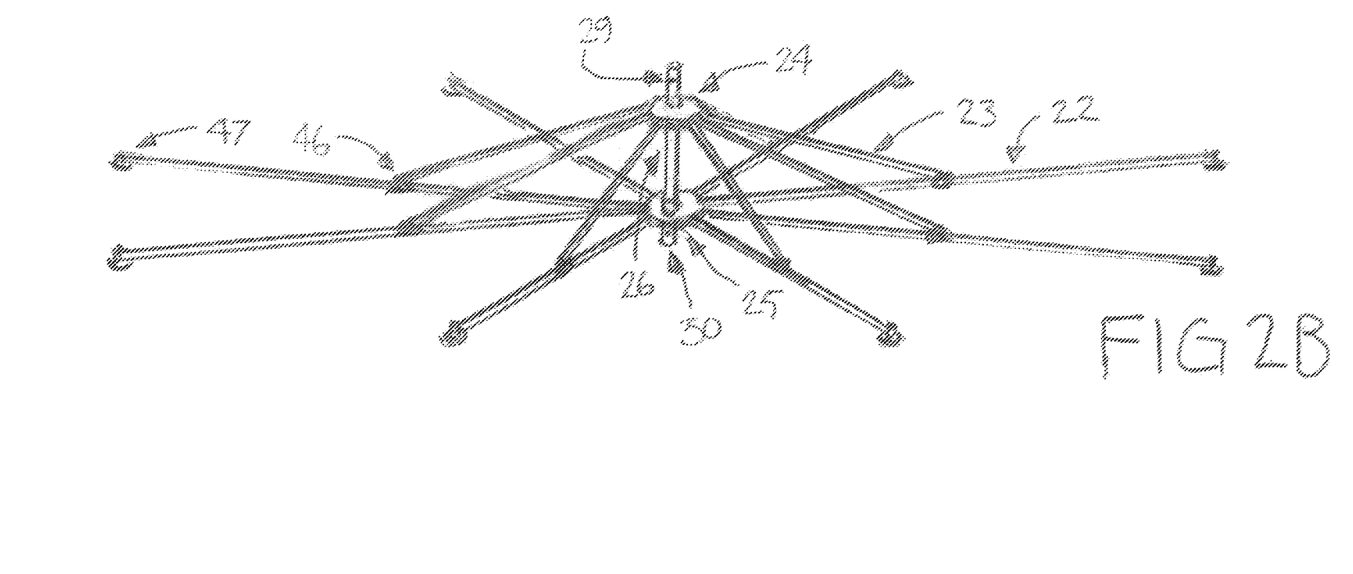
FIG. 2B is a perspective of symmetrical umbrella frame without fabric, in a fully open configuration as seen from above

FIG. 2B is a perspective of a symmetrical umbrella frame without fabric, showing the main features of a multitude of ribs 22 and stretchers 23 with a short center shaft 26. The ribs and stretchers are made from carbon fiber, fiberglass, wood, plastic or aluminum with umbrella fabric connection features made from aluminum, plastic or stainless steel. The easily detachable shade fabric may go over or under the ribs 22 for esthetics or function.

Figure 3:
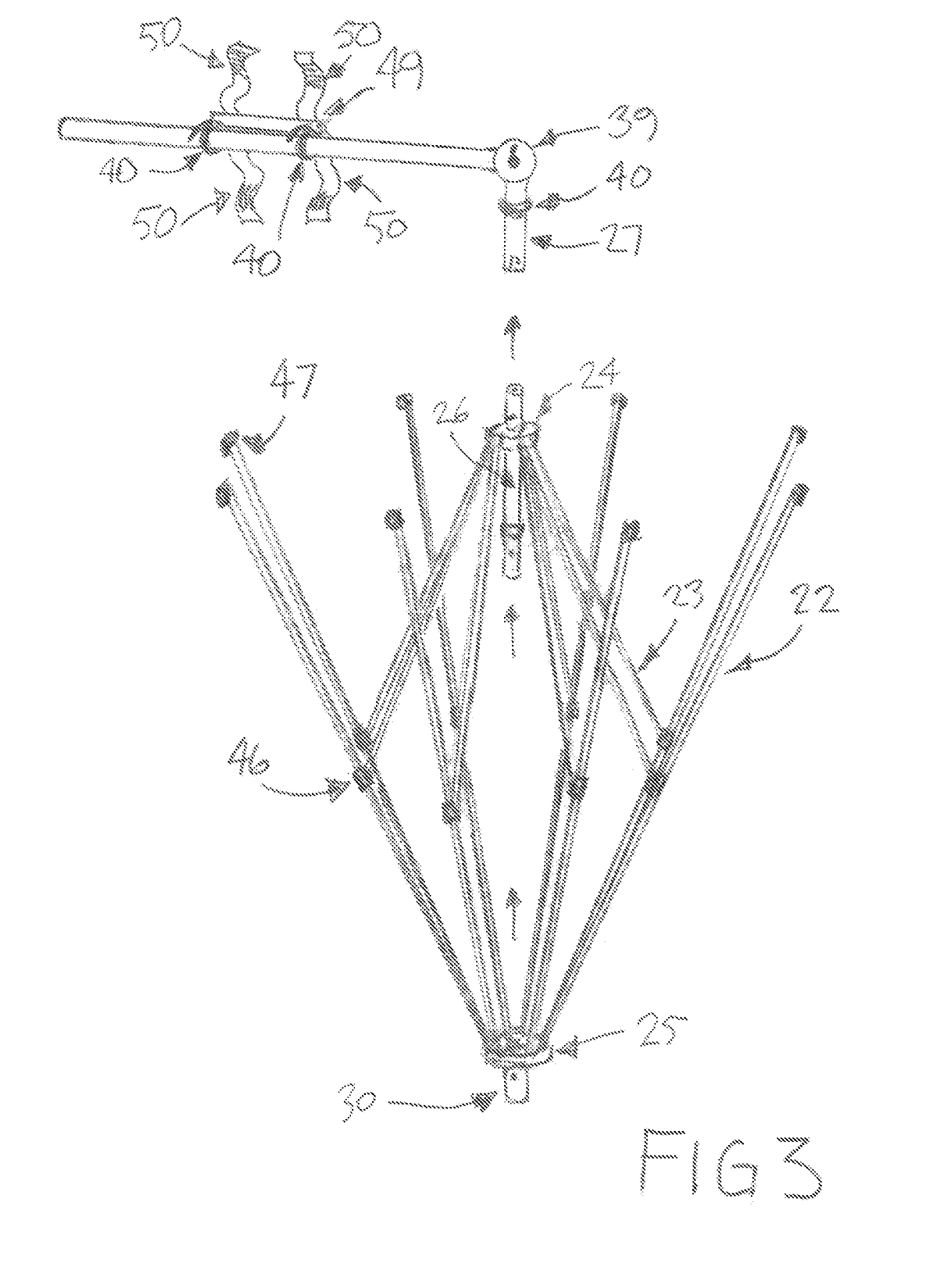
FIG. 3 is a perspective view of sailboat boom wrap mount cantilever hanger arm above partially open, inverted symmetrical umbrella framework without fabric

FIG. 3 is a perspective of the partially open, inverted symmetrical umbrella framework as it would align with a sailboat boom wrap mount 49 cantilever hanger 27 above. The sailboat boom mount is secured overhead by wrapping and securing the hook and loop webbing 50 around the boom, adjusting for length and tilt with circumference clamps 40. Also showing the shade apparatus without fabric, showing a partial movement of the rib 22 and stretcher 23 as the rib tips 47 move horizontally outward and the keystone hinges 46 move upward and outward as the lower hub handle 30 is lifted. This important operational feature adds to the freedom of movement under the umbrella shade apparatus, where boat occupants are not required to move during opening and closing of the umbrella framework.

Figure 4:
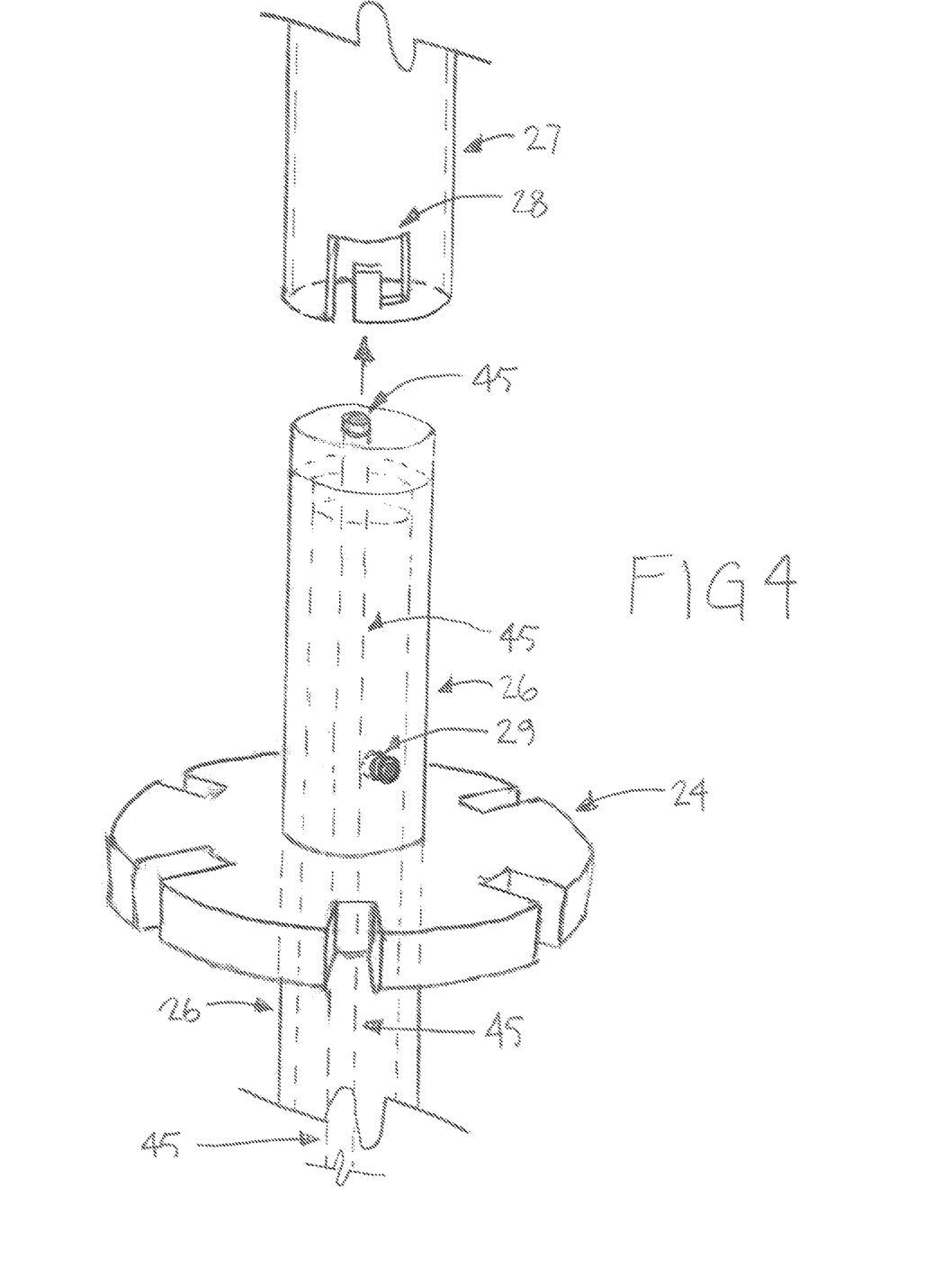
FIG. 4 is a perspective of upper umbrella short center shaft connection with slotted bayonet socket and center vertical pushrod lock

FIG. 4 is a perspective of the top of the umbrella framework center shaft 26 connection to the hanger bayonet socket 27. Also shown is the pushrod lock 45 feature of shaft to socket. When the umbrella bundle is lifted, turned and dropped into position, the next step is to deploy the shade by lifting and locking the umbrella handle 30 from below. That lifting action also raises the outer push collar 44 shown in FIG. 5 which is pinned to the vertical pushrod shaft 45 through vertical slots in the center shaft 26 and thereby locks into place and prevents the open umbrella apparatus from being removed from the holder apparatus hanger socket 27. To remove the shade apparatus, the umbrella is released at the handle 30, the umbrella framework operates in reverse and the pushrod 45 drops and allows the center shaft 26 to be lifted, firmly turned counterclockwise and removed. Also shown are the upper umbrella hub 24 with a multitude of stretcher connection slots, fixed solidly to center shaft 26. Also shown is the fixed bayonet pin 29 that holds the center shaft 26 in place in the bayonet hanger slot 28.

Figure 5:
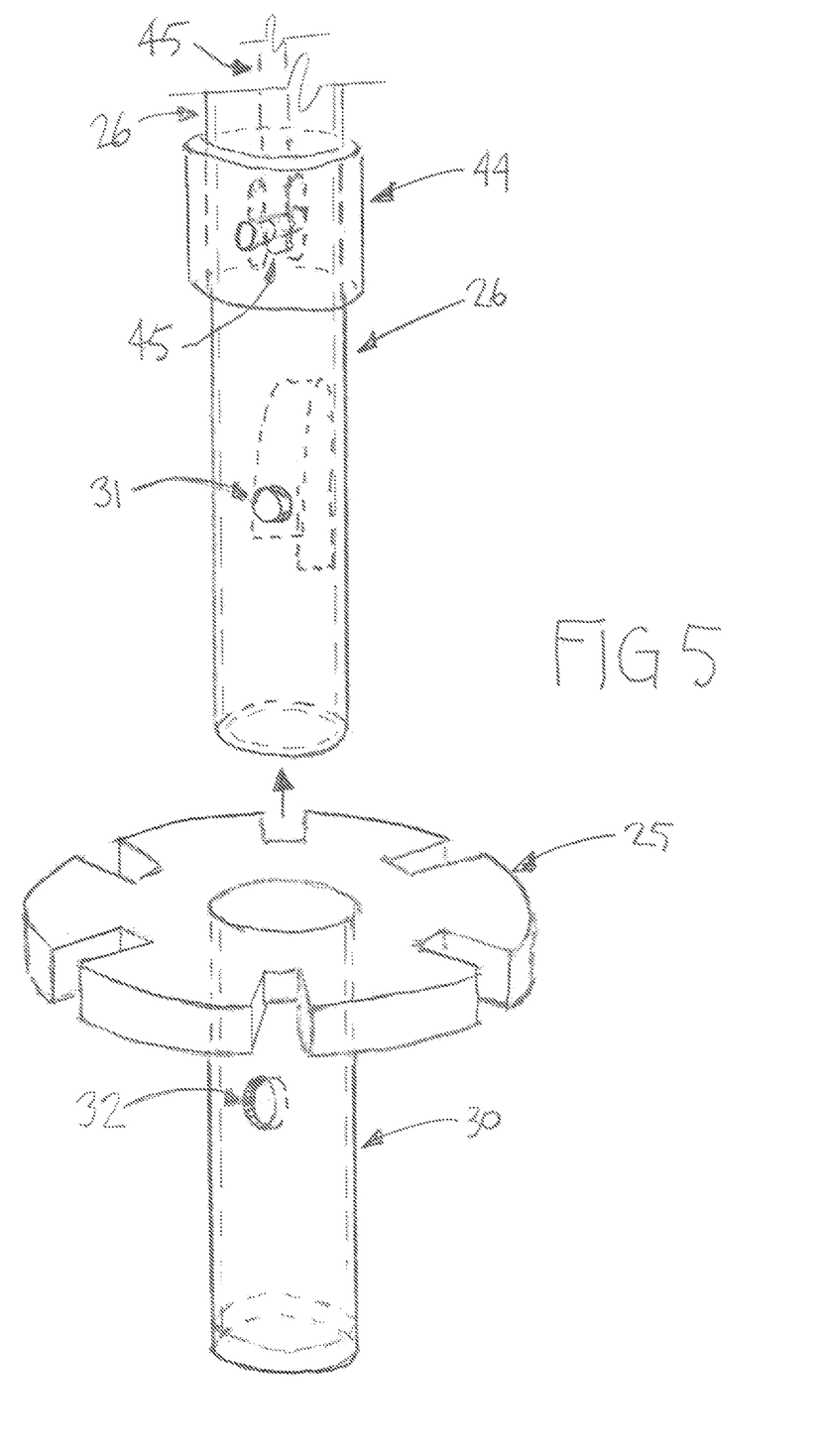
FIG. 5 is a perspective of lower short center shaft with internal push snap pin and vertical push collar for pushrod lock, with lower umbrella shade hub and handle

FIG. 5 is a perspective of the lower umbrella hub 24 solidly fixed to handle 30, aligned to connect with push spring snap pin 31 and push collar 42 for the pushrod lock in FIG. 4. As the final step of putting the shade in place, the handle 30 is lifted vertically to spring pin 31 lock in position over the center shaft 26 which moves the multitude of umbrella ribs 22 into position. The handle movement depresses the push snap pin 31 as it rises until the snap pin clicks into place at the handle pin hole 32, this movement also pushes collar 44 into locked position. The push collar lifts the center pushrod 45 into place, locking the center pushrod FIG. 4 into place. To remove the umbrella, pushing the snap pin 31 at the handle then allows the handle to release and drop by gravity until the shade apparatus is suspended by the hanger. The center shaft pushrod 45 lock also releases, allowing the shade apparatus to be lifted, turned counterclockwise and removed.

Figures 6A, 6B, 6C:
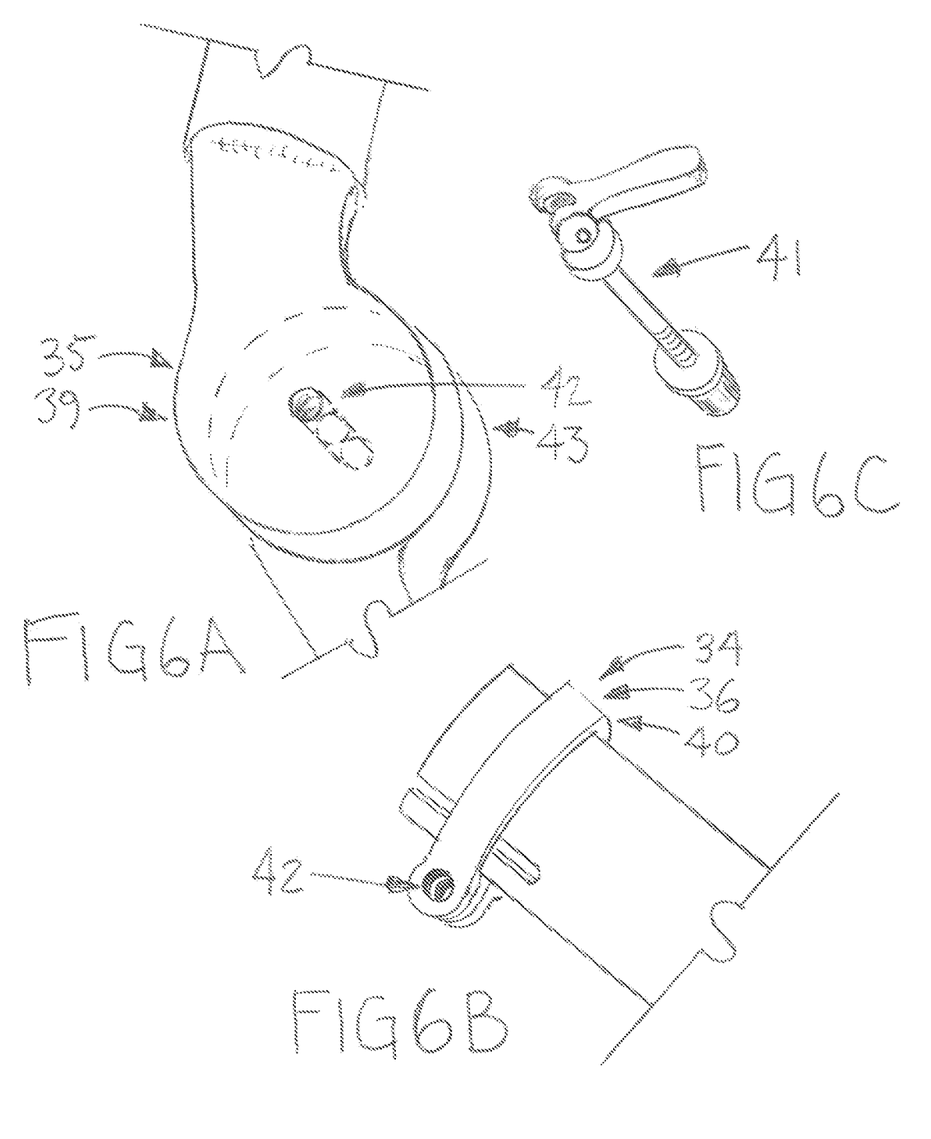
FIG. 6A is a perspective of holder apparatus at angle connection clamp
FIG. 6B is a perspective of holder apparatus at circumference connection clamp
FIG. 6C is a perspective of cam bolt used at adjustable connection clamps

FIG. 6A is a perspective view of axial rotation friction clamp 39 at cantilever holder end. This clamp uses surface mating friction around the cam bolt hole 38 and quick release cam bolt 37 to adjust angle position. The cam bolts 37 are used repeatedly at all hanger adjustment points to make the shade system extremely flexible in how shade is positioned.

FIG. 6B is a perspective view of tubular circumference clamp 39 at cantilever telescoping tubes. This clamp uses surface mating friction around the circumference by urging at cam bolt hole 38 and quick release cam bolt 37 to adjust angle position.

FIG. 6C is a perspective view of quick release cam bolt 37.

Figure 7A:
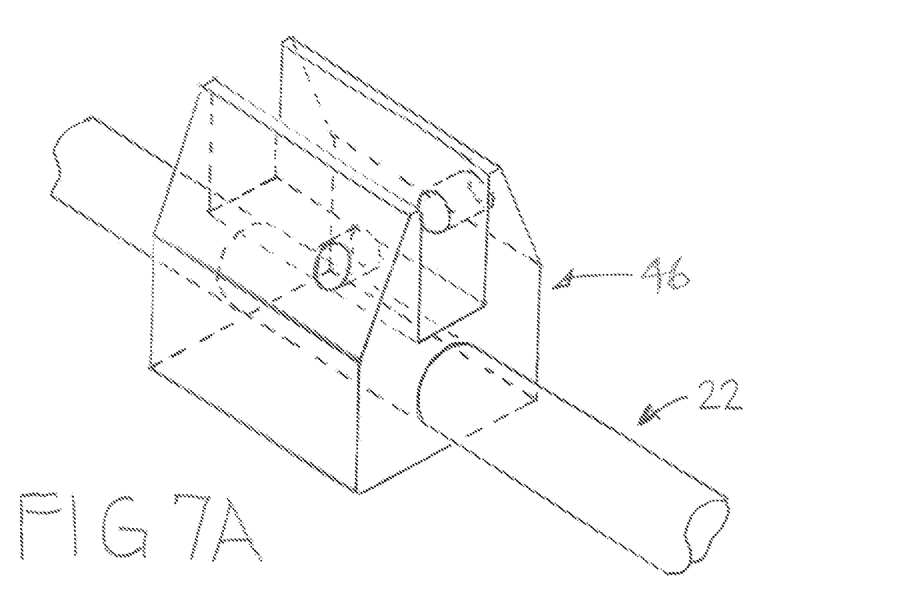
FIG. 7A is a perspective of umbrella rib keystone hinge for stretcher connection

FIG. 7A is a perspective view of keystone fit rib hinge 46 which pin attaches umbrella stretcher 23 at the tip and pivots with the umbrella rib 22. In the closed position, the inclined surfaces of the keystone hinge mate together with each other to form a strong ring. This helps make the closed shade apparatus feel more solid.

Figure 7B:
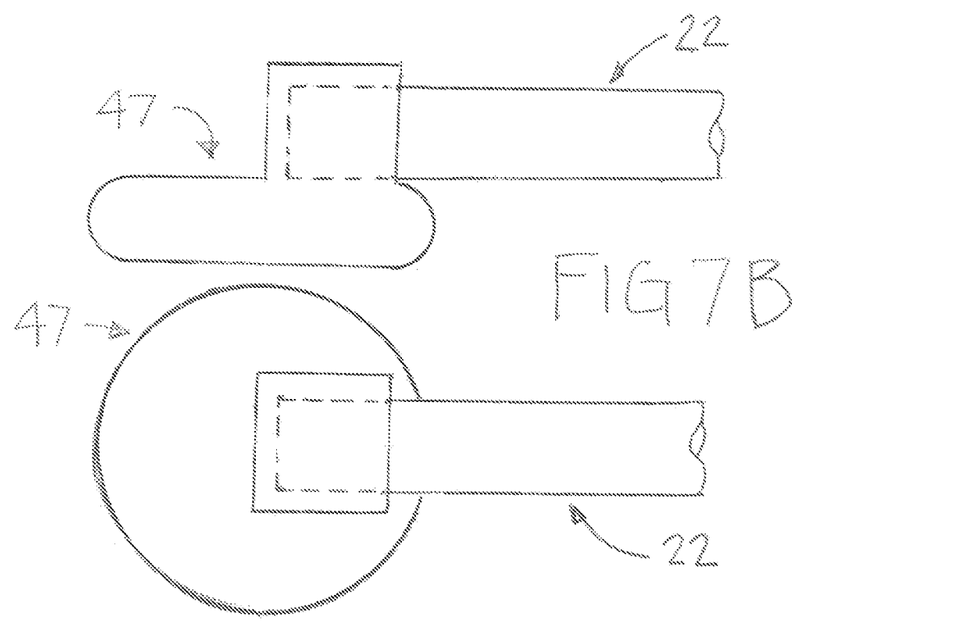
FIG. 7B is a side and top view of umbrella rib tip for releasable fabric connection

FIG. 7B is a side and top view of the rib tip 47 attached over the outer tip of the umbrella rib 22. The thickness and shape of the tip is for eye socket safety. The circular surface of the tip is to mount the fabric release options required for safety in high wind conditions.

Figure 8:
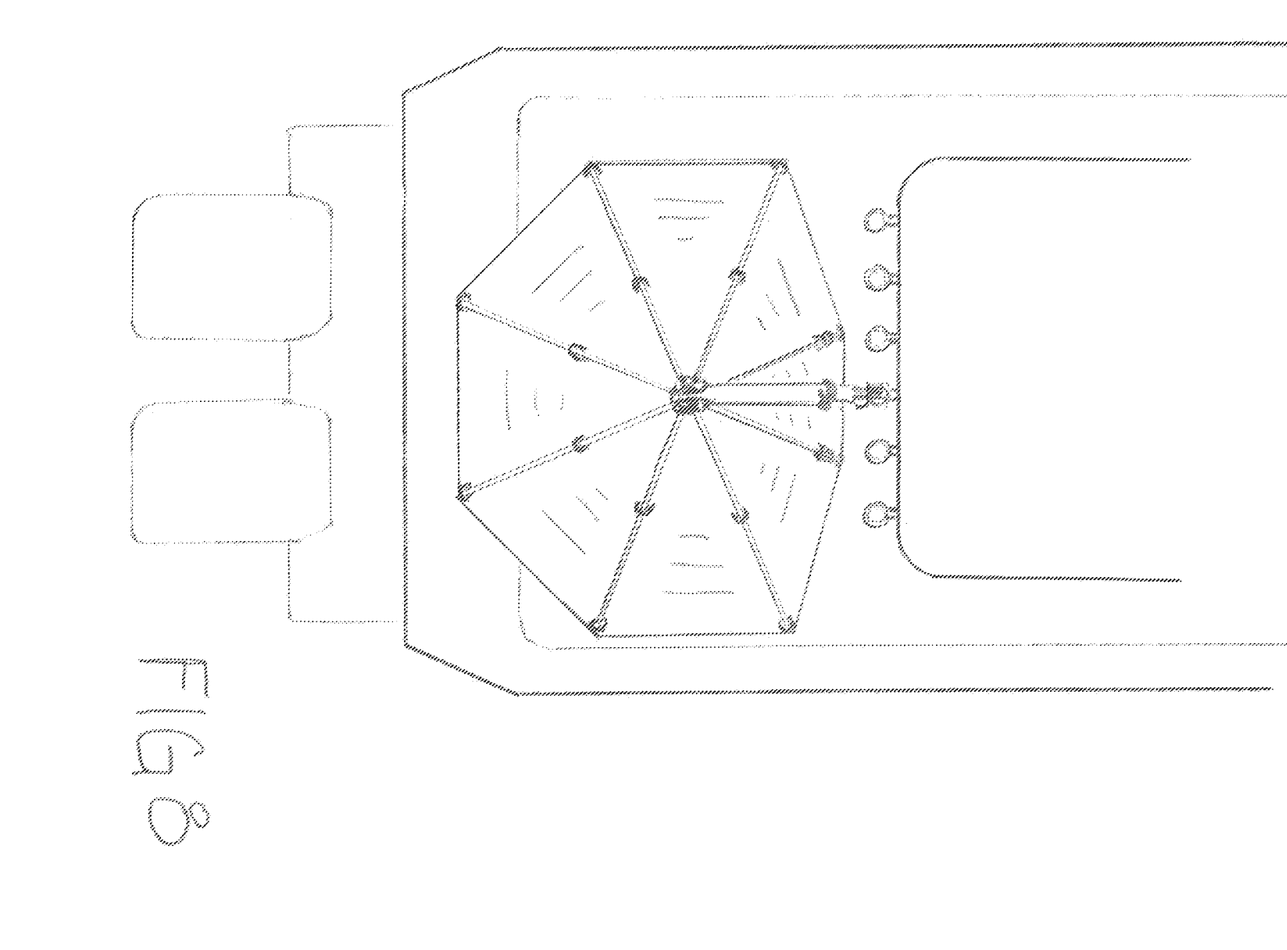
FIG. 8 is a top view of opened shade on a center console boat with T-top rod holders

FIG. 8 is an overhead view of a fully open asymmetrical umbrella shade apparatus on a fishing boat, with a rod holder mounted short cantilever holder apparatus.

REFERENCE NUMBERS 21 shade fabric
22 umbrella rib
23 umbrella stretcher
24 upper umbrella hub
25 lower umbrella hub
26 short center shaft
27 umbrella hanger socket
28 hanger socket slot
29 fixed shaft pin
30 lower hub handle
31 push spring snap pin
32 snap pin hole
33 slotted fishing rod holder extension insert
34 umbrella arch position circumference clamp
35 umbrella height angle clamp
36 umbrella tilt and cantilever length circumference clamp
37 cantilever slide outside tube
38 cantilever slide inside tube
39 umbrella tilt angle clamp
40 umbrella axis rotation circumference clamp
41 quick release bolt and cam nut
42 bolt and cam clamp hole
43 angle rotational clamp
44 vertical lock push collar
45 vertical lock pushrod
46 keystone fit rib hinge
47 flat surface rib tip
48 holder mount for flat surface
49 sailboat boom wrap mount
50 hook and loop fastener on webbing Operation This shade system is designed for freedom of movement under the shade, and quick simple deployment and storage. The shade umbrella framework and fabric are designed to hold the shade fabric firmly in place, attached firmly to the umbrella ribs in low wind, but designed to safely release the fabric when high wind conditions would otherwise force the umbrella to move or structurally collapse.

To operate a system designed for common fishing boat with rod holder configuration:

(1) The boater would first configure the holder apparatus and umbrella hanger for the approximate shade position
(2) The holder apparatus is next lifted into position and inserted into rod holders thereby positioning the umbrella hanger approximately between the sun and boat occupants
(3) The closed shade apparatus is then lifted into position and attached to hanger with a firm turn, thereby resting at a gravity hanging position
(4) Shade is next provided by lifting the lower umbrella hub vertically to unfold the fabric and fully open the umbrella framework where the lower hub handle inserts and locks into the short umbrella shaft
(5) Shade position can now be moved around holder apparatus adjustment points, offering a broad range of shade cover as the sun moves through the day
(6) Preparing for boat travel or for high winds, the umbrella shade apparatus is quickly removed by the release button at the lower hub handle, lowering the umbrella hub and closing the shade until the apparatus is fully rested by gravity
(7) Umbrella shade apparatus is then freed from the umbrella hanger by lifting and turning the umbrella opposite direction and safely stored for boat travel or high wind conditions
(8) Designed for safety and durability, the impact of high wind is quickly relieved by allowing the fabric section edges to separate under predetermined pressure so that fabric flutters as if a flag, protecting occupants, boat features, and the umbrella itself In other embodiment configurations, hardtop boat, dinghy, patio boat, sailboat, recreational vehicle, yacht, outdoor patio or trellis, the operation changes based on how the shade apparatus is located as a means to position the hanger in the desired position, by telescoping, sliding, inserting, surrounding or permanently attaching at a suitable sturdy placement.

What is claimed:

1. A suspended inverted umbrella shade system comprising:
a shade apparatus comprising a hanger, an umbrella shade framework, and a safety fabric,
an umbrella holder apparatus thereby suspending said shade apparatus with a quickly-connectable quickly-releasable umbrella hanger socket at a proximal position of the umbrella shade framework,
an axial and angular adjustment system for said umbrella holder to lock said hanger and umbrella shade framework at a desired height, tilt angle and umbrella axis rotation,
the umbrella shade framework being an inverted opening umbrella framework for the said suspended shade apparatus, wherein the framework is fully deployed by lifting a lower umbrella framework hub until it is fastened to a bottom of an umbrella short center shaft, causing an attached plurality of ribs of said framework to angulate and move rib tips thereof outward in connection to a corresponding plurality of umbrella frame stretchers attached at proximal ends to an upper hub and at distal ends to rib hinges, wherein said plurality of umbrella framework ribs and stretchers are each connected with wedge angle surfaced hinges, wherein the closed framework requires all center oriented hinge surfaces to interlock as in a firm keystone ring,
a short center shaft and lower hub quick-connection quick-release locking system for said framework fixing said shade framework into full up and open position, and
a fabric release system wherein said safety fabric reacts to high wind forces urging detachment of the fabric at a plurality of rib tips thereby substantially releasing said safety fabric pressure to allow the fabric to fluttering while firmly attached at said umbrella hub.

2. A suspended inverted umbrella shade system as in claim 1, further comprising a bayonet connection with a slotted lock system using one or more placement slots in the umbrella hanger socket and pins in the hanger at the insertion of said umbrella wherein suspended shade position is firmly set.

3. A suspended inverted umbrella shade system as in claim 1, wherein said fabric release system comprises mated interlocking hook and loop surfaces system allowing fabric surface connection release at substantial wind pressure.

4. A suspended inverted umbrella shade system as in claim 1, wherein said fabric release system comprises a spring loaded pinch connection to fabric mechanism allowing fabric release at substantial wind pressure.

5. A suspended inverted umbrella shade system as in claim 1, wherein said fabric release system comprises a breakable material tie to fabric connection, allowing said tie to break thereby releasing fabric at substantial wind pressure.

6. A suspended inverted umbrella shade system as in claim 1, wherein said fabric release system comprises a snap fastener including a rib tip snap connection to fabric button mechanism, allowing fabric snap button release at substantial wind pressure.

7. A suspended inverted umbrella shade system as in claim 1, wherein the short center shaft comprises an internal slidable rod that is urged upwardly as the lower hub is locked into the open position to prevent the suspended framework from being rotated or removed when the umbrella framework is opened.

8. A suspended inverted umbrella shade system comprising:
a shade apparatus comprising a hanger, a suspended inverted umbrella framework, and a safety fabric with release,
a holder apparatus for removably suspending the shade apparatus, wherein a mounted overhead cantilever assembly works as a means to suspend said shade assembly in optimal position horizontally, vertically and rotationally to block the sun, the holder apparatus comprising:
a hanger socket,
a mounting system for secure fixed attachment of said cantilever assembly to a boat tower or boat top or boat enclosure or sailboat boom or sailboat mast structure, wherein the mounting system comprises a slotted tip base tube insertable into an existing fishing rod holder socket as a means to fix said cantilever assembly at the proper height and rotation
a cantilever adjustment system comprising a plurality of pivotally adjustable indicium connections to support said hanger socket and provide up to 360 degrees horizontal and vertical positioning of said shade apparatus around the holder apparatus to fix said shade apparatus in a vertical or tilted position for optimal shade,
a plurality of telescoping tube members within said cantilever assembly attached to said connections as a slidable means for additional length and rotation added to the linear separation between said mounting system and said hanger socket at the opposite end.

9. A suspended inverted umbrella shade system as in claim 8, wherein a clamp is installed around an existing structural member of a boat tower, sailboat boom or vehicle roll cage as a means to connect said cantilever assembly.

10. A suspended inverted umbrella shade system as in claim 8, using a flat base connector with a through bolt hole to connect said cantilever assembly to a vertical or horizontal flat surface.

11. A suspended inverted umbrella shade system as in claim 8, wherein a plurality of adjustable cam lever clamp bolts urge fixed positioning at all adjustable movement points, axially within the rod holder, angularly above the rod holder, linearly and axially within the telescoping tube members, angularly above the umbrella assembly hanger, and axially within said hanger as a means to firmly position said umbrella shade system.

12. A suspended inverted umbrella shade system as in claim 8, wherein a plurality of adjustable cam lever clamp bolts urge fixed positioning at all angular, linear and axial connections as a means to firmly position said umbrella shade system.

* * * * *